US012579187B2

(12) United States Patent
Nakazawa et al.

(10) Patent No.: US 12,579,187 B2
(45) Date of Patent: Mar. 17, 2026

(54) INFORMATION-PROCESSING DEVICE, INFORMATION-PROCESSING METHOD AND INFORMATION-PROCESSING PROGRAM

(71) Applicant: RAKUTEN GROUP, INC., Tokyo (JP)

(72) Inventors: Mitsuru Nakazawa, Tokyo (JP); Bjorn Stenger, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 369 days.

(21) Appl. No.: 18/018,044

(22) PCT Filed: Oct. 26, 2021

(86) PCT No.: PCT/JP2021/039472
§ 371 (c)(1),
(2) Date: Jan. 26, 2023

(87) PCT Pub. No.: WO2023/073807
PCT Pub. Date: May 4, 2023

(65) Prior Publication Data
US 2024/0281468 A1     Aug. 22, 2024

(51) Int. Cl.
*G06F 16/583*     (2019.01)
*G06F 16/55*     (2019.01)

(52) U.S. Cl.
CPC .......... *G06F 16/5846* (2019.01); *G06F 16/55* (2019.01)

(58) Field of Classification Search
None
See application file for complete search history.

(56) References Cited

U.S. PATENT DOCUMENTS

| | | | |
|---|---|---|---|
| 8,775,436 B1* | 7/2014 | Zhou | G06V 30/416 |
| | | | 707/748 |
| 9,311,568 B1* | 4/2016 | Feller | G06V 20/62 |
| 10,402,641 B1* | 9/2019 | Dang | G06F 16/353 |
| 2002/0038299 A1* | 3/2002 | Zernik | G06F 16/48 |
| 2011/0099003 A1* | 4/2011 | Isozu | G06F 16/93 |
| | | | 704/E11.001 |
| 2017/0364492 A1* | 12/2017 | Pushnyakov | G06V 30/19147 |
| 2019/0080207 A1* | 3/2019 | Chang | G06F 16/7837 |

FOREIGN PATENT DOCUMENTS

JP          2017021594          1/2017

* cited by examiner

*Primary Examiner* — Mark R Milia
(74) *Attorney, Agent, or Firm* — HEA Law PLLC

(57)          ABSTRACT

Provided is an information-processing device for extracting an important image from target information including images and a text, the information-processing device including: a CPU; and a memory storing instructions for causing the information-processing device, when executed by the CPU, to: determine a category indicating an attribute of each image; extract a category for each division of the text; determine a score of the category based on the text; and extract, as a most important image, one of the images corresponding to the category selected based on the score.

18 Claims, 13 Drawing Sheets

INFORMATION-PROCESSING DEVICE, INFORMATION-PROCESSING METHOD AND INFORMATION-PROCESSING PROGRAM

CROSS-REFERENCE TO RELATED APPLICATION

The present disclosure contains subject matter related to that disclosed in International Patent Application PCT/JP2021/039472 under the Patent Cooperation treaty filed in the Japan Patent Office on Oct. 26, 2021, the entire contents of which are hereby incorporated by reference.

BACKGROUND OF THE INVENTION

1. Field of the Invention

The present invention relates to an information-processing device, an information-processing method, and a non-transitory computer-readable information recording medium.

2. Description of the Related Art

In JP 2017-21594 A, there is described a content creation system which selects, based on a rule managed by a rule management unit, images to be used for a slideshow from images managed by an image management unit, creates creation instruction information, and creates the slideshow through use of this creation instruction information and the images managed by the image management unit.

SUMMARY OF THE INVENTION

There is provided an information-processing device for extracting an important image from target information including images and a text, the information-processing device including: a CPU; and a memory storing instructions for causing the information processing device, when executed by the CPU, to: determine a category indicating an attribute of each image; extract a category for each division of the text; determine a score of the category based on the text; and extract, as a most important image, one of the images corresponding to the category selected based on the score.

There is also provided an information-processing method of extracting an important image from target information including images and a text, the information-processing method causing a computer to execute: determining a category indicating an attribute image; extracting a category for each division of the text; determining a score of the category based on the text; and extracting, as a most important image, one of the images corresponding to the category selected based on the score.

There is also provided a non-transitory computer-readable information recording medium storing an information-processing program for causing a computer to: determine a category indicating an attribute of each image; extract a category for each division of the text; determine a score of the category based on the text; and extract, as a most important image, one of the images corresponding to the category selected based on the score.

DESCRIPTION OF THE EMBODIMENTS

There can exist a certain demand for automatically extracting, from content including a plurality of images and a text, important images which can attract attention of a user to the content. For example, the attention of the user can more effectively be attracted through use of secondary content which uses important and usually a small number of images extracted from various pieces of content such as web pages and electronic books and magazines which present physical products and service products (travel products and the like) to users. Such secondary content is, for example, slideshows, moving images, and two-dimensional images formed by arranging the extracted images in a tile form.

However, it is not realistic to manually and exhaustively extract important images from a large amount of content. Moreover, a publicly known technology as described in Patent Literature 1 is a technology which simply selects images based on a predetermined specific rule, for example, such a rule that a specific person is appearing in an image and there has not been known a technology which extracts important images in accordance with a context which differs from one piece of content to another piece of content.

The present invention disclosed hereafter enables to automatically extract, from content including a plurality of images and a text, an important image which can attract attention of a user to the content.

Figure 1:
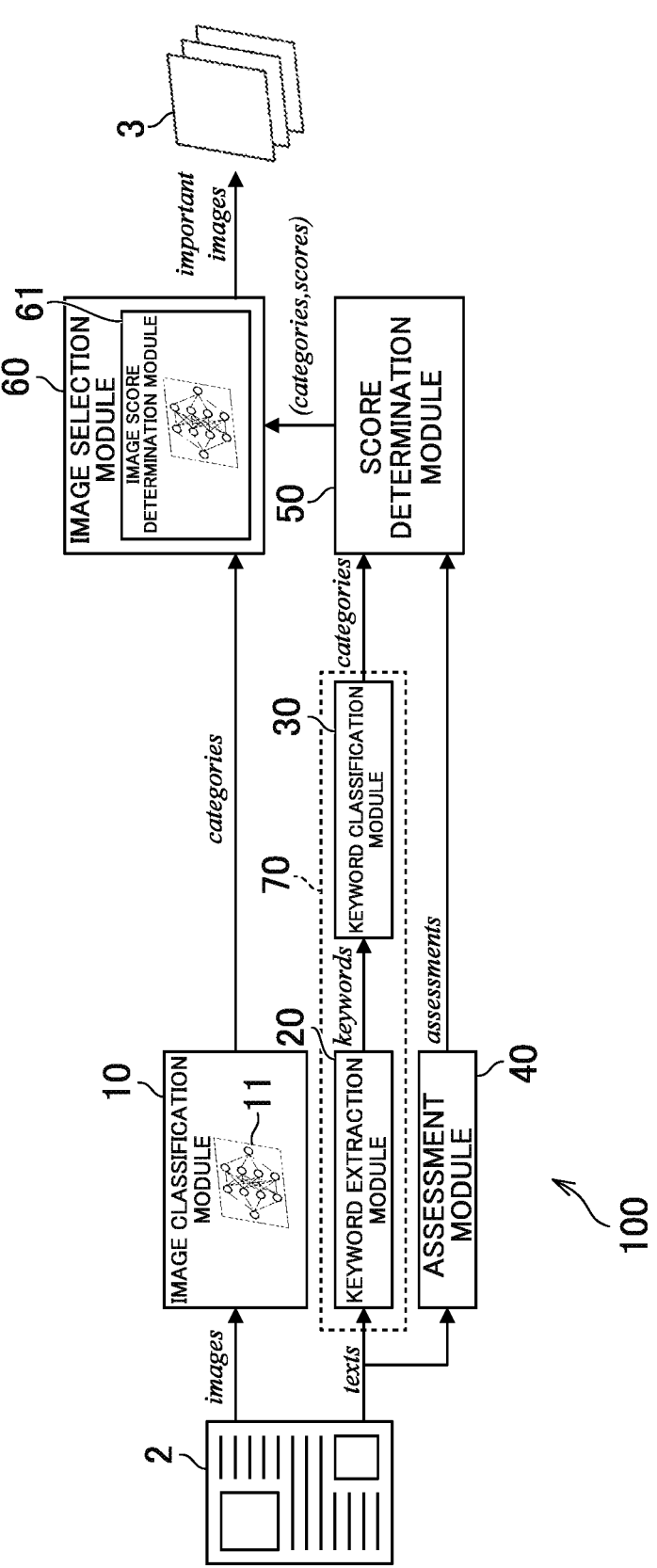
FIG. 1 is a functional conceptual diagram of an information-processing device according to a first embodiment of the present invention.

FIG. 1 is a functional conceptual diagram of an information-processing device 100 according to a first embodiment of the present invention. The information-processing device 100 is implemented by appropriate physical means, for example, a computer for executing an appropriate computer program, implementing functions of FIG. 1.

The information-processing device 100 includes an image classification module 10, a keyword extraction module 20, a keyword classification module 30, an assessment module 40, a score determination module 50, and an image selection module 60. Moreover, the information-processing device 100 is configured to receive target information 2 being a target of information processing as input, and to output one or a plurality of important images 3.

A brief description is now given of the information processing to be executed by the information-processing device 100. The target information 2 is information which includes images and a text, and is usually information forming content presented to a consumer. As such content, a web page and electronic book and magazine are exemplified. Moreover, it is effective to prepare, for purposes such as introducing the content to the consumer and guiding the consumer to the content, secondary content which briefly indicates a substance of the content, and allows the consumer to view the content in a short period.

The information-processing device 100 is built so that the information-processing device 100 matches this purpose. As this secondary content or to create this secondary content, a desired number of, for example, about five to ten important images are extracted from the plurality of images included in the target information 2. The important images to be extracted are required to be selected so that the attention of the consumer is attracted more in a short time.

However, which image is to be assessed as the important image depends on a context of the target information 2. For example, when the target information 2 is a web page for introducing a hotel, photographs of an exterior of the hotel, states of rooms thereof, and dishes to be served and the like are required to be properly assessed as important images. However, an irrelevant image included in the target information 2 by chance, for example, a photograph of a blue sky may be attractive as viewed as a photograph alone, but is inappropriate to attract the consumer to the target information 2.

Thus, the information-processing device 100 uses the text of the target information 2 to extract important images matching the context of the target information 2 itself.

A simple and clear description is now given of the components of the information-processing device 100. The image classification module 10 determines a category indicating an attribute of an image. The category is a keyword indicating the attribute of the image, that is, a meaning of the image to the consumer in the context of the target information 2. As exemplified in line with the previous example, when the target information 2 is the web page for introducing the hotel, a word indicating an aspect of the hotel expressed by a photograph is the category. Specifically, each of an appearance, a front desk, a lobby, a room, a view, a dish, a bathroom, an amenity, and the like corresponds to the category. That is, the image classification module 10 classifies various images included in the target information 2 to a category corresponding thereto.

The keyword extraction module 20 extracts keywords from the text. It is considered that the text included in the target information 2 have a description in line with a context thereof. Keywords reflecting this context are thus to be included. Those keywords diverge over a wide range, and include, for example, lunch, buffet, bedroom, and view. The keywords may or may not match a word indicating the category.

The keyword classification module 30 determines a category corresponding to the keyword. That is, the extracted keyword itself does not match a word indicating a category, and it is impossible to directly use the keyword such that the text is used to assess the image. Thus, the keyword classification module 30 serves to classify the extracted keyword into the category, to thereby convert the keyword to the category. Specifically, words such as breakfast, lunch, dinner, buffet, and restaurant are to be classified into a category of "dish." Words such as bedroom, interior, and wallpaper are to be classified into a category of "room."

The assessment module 40 is not always an indispensable component, and assesses whether the text is affirmative or negative in this embodiment. Specifically, when a portion of the text from which a certain keyword is extracted, for example, a sentence, is used in a positive context, the positive assessment is made. When the same portion is used in a negative context, the negative assessment is made. That is, the assessment module 40 serves to semantically add the assessment to the extracted keyword.

The assessment is added by the operation of the assessment module 40 to the keyword extracted in the keyword extraction module 20, and hence information formed of a set (keyword, assessment) of the keyword and the assessment is obtained. Further, the keyword is classified into the category by the keyword classification module 30. Thus, information (category, assessment) formed of a set of the category and the assessment is finally obtained from the text.

The score determination module 50 determines a score of the category based on the text. In this embodiment, the score for each category is obtained from the information (category, assessment) formed of the set of the category and the assessment. As a result, information (category, score) formed of a set of the category and the score is obtained.

In the manner described above, the category of the image classified by the image classification module 10 and the score obtained from the text can be associated with each other. The image selection module 60 selects categories based on the scores, and extracts the images corresponding to those categories as important images 3.

Description is given later of specific details of the information processing executed in the image classification module 10, the keyword extraction module 20, the keyword classification module 30, the assessment module 40, the score determination module 50, and the image selection module 60 described above.

Figure 2:
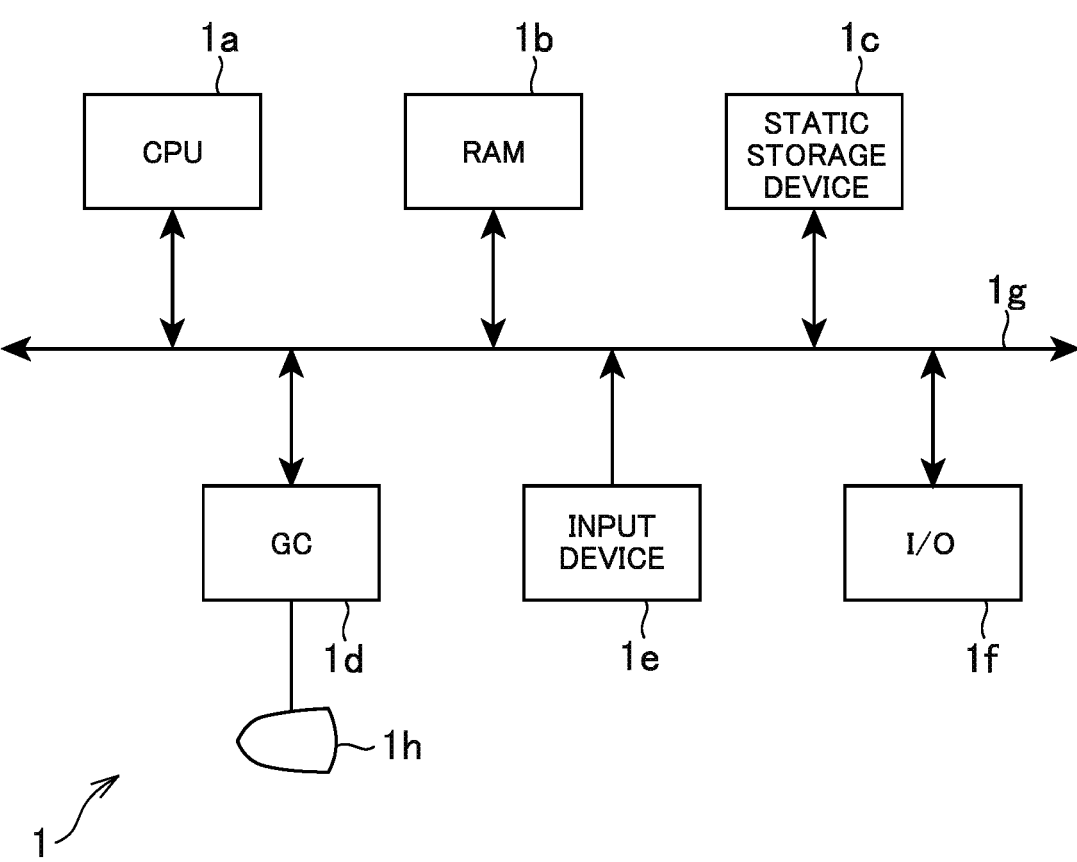
FIG. 2 is a configuration diagram for illustrating a representative physical configuration of a general computer.

The information-processing device 100 described above may be physically implemented through use of a general computer. FIG. 2 is a configuration diagram for illustrating a representative physical configuration of such a general computer 1.

In the computer 1, a central processing unit (CPU) 1_a_, a random access memory (RAM) 1_b_, a static storage device 1_c_, a graphics controller (GC) 1_d_, an input device 1_e_, and an input/output (I/O) 1_f_ are connected through a data bus 1_g_ so that electrical signals can mutually be transmitted and received. In this configuration, the static storage device 1_c_ is a device which can statically record information, such as a hard disk drive (HDD) or a solid state drive (SSD). Moreover, the signal from the GC 1_d_ is output to a monitor 1_h_ for a user to visually recognize an image, such as a cathode ray tube (CRT) or a so-called flat panel display, and is displayed as an image. The input device 1_e_ is a device for the user to input information, such as a keyboard, a mouse, or a touch panel. The I/O 1_f_ is an interface for the computer 1 to transmit and receive information to and from external devices. A plurality of CPUs 1_a_ may be prepared so that parallel computing is executed in accordance with a load of the information processing required to be executed by the computer 1.

An information-processing program including an instruction sequence for causing the computer 1 to function as the information-processing device 100 is installed in the static storage device 1c, is read out onto the RAM 1b as required, and is executed by the CPU 1a. Moreover, this program may be recorded in an appropriate computer-readable information recording medium such as an appropriate optical disc, magneto-optical disc, or flash memory, and may then be provided, or may be provided through an information communication line such as the Internet. Moreover, the interface to be used by the user of the information-processing device 100 may be implemented on the computer 1 itself, and the user may directly operate the computer 1, may be implemented by a method of the so-called cloud computing in which general-purpose software such as a web browser is used on another computer and a function is provided from the computer 1 through the I/O 1f, or may further be implemented so that the computer 1 provides an application programing interface (API) available for another computer so that the computer 1 operates as the information-processing device 100 in response to a request from the another computer.

Each of the components of the information-processing device 100 of FIG. 1 may be implemented by the CPU 1c executing an appropriate information-processing program in the computer 1 or assigning an appropriate storage area to the RAM 1b and/or the static storage device 1c.

Referring back to FIG. 1, the image classification module includes a machine learning model 11 which receives the image as input and outputs the category in this embodiment. An example of this machine learning model 11 is a classifier implemented by a convolutional neural network (CNN). The classifier is caused to learn to output words and phrases indicating a category prepared in advance for the input of the image.

The machine learning model 11 included in the image classification module 10 is not limited to the CNN. The machine learning model 11 may be, for example, a machine learning model connected to a transformer-based model caused to learn in advance. Moreover, the machine learning model 11 may be a machine learning model other than the deep neural network (DNN), for example, a support vector machine (SVM) based on a feature amount of the image or another model.

Figure 3:
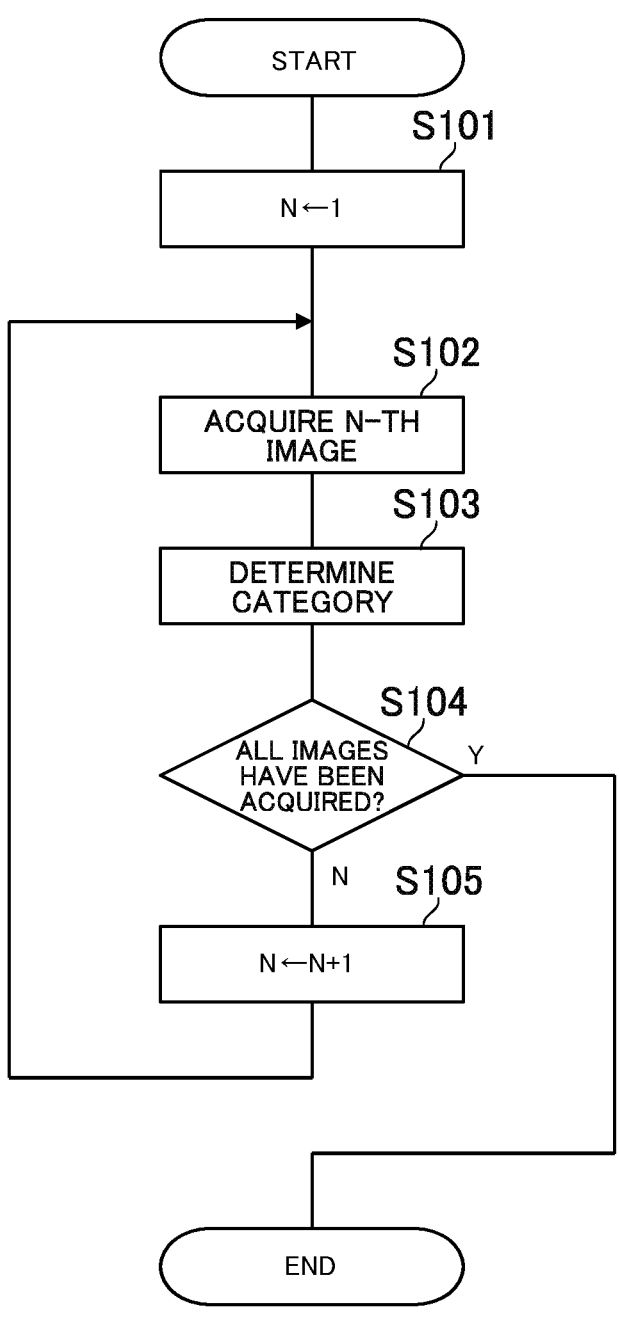
FIG. 3 is a flowchart for illustrating an example of processing of an image classification module.

FIG. 3 is a flowchart for illustrating an example of the processing of the image classification module 10. The image classification module 10 assigns 1 to a variable N in Step S101, and subsequently acquires an N-th image included in the target information 2 in Step S102. In Step S103, the image classification module 10 determines the category of the acquired image. In this embodiment, the category of the acquired image is obtained by inputting this image into the machine learning model 11.

After that, in Step S104, it is determined whether or not all of the images included in the target information 2 have been acquired. When images which have not been acquired exist, 1 is added to N in Step S105. The process then returns to Step S102, and the subsequent processing steps are repeated. When all of the images have been acquired, the categories have been determined for all of the images included in the target information 2, and the processing is thus finished.

Referring back to FIG. 1, in this embodiment, the keyword extraction module 20 divides the text included in the target information 2 into any units, and extracts a keyword for each division. The division of the text may be determined in accordance with a nature of the target information 2, and is a sentence in this embodiment. As another example, it is conceivable to use a paragraph as the division, or to use, when the text is reviews of, for example, a product by a plurality of users or includes the reviews, each review as the division.

The extraction of the keywords by the keyword extraction module 20 may be executed by feature word extraction in a known natural language analysis method. Specifically, importance of a word included in the text is obtained by the time frequency-inverse document frequency (TF-IDF), and a word having the highest importance or one or a plurality of words having importance higher than a predetermined threshold value in the division are extracted as the keywords. Depending on a language of the text being the target of the extraction of the keywords, appropriate preprocessing such as decomposition of the texts into the words and filtering based on the part of speech of the word may be performed before the TF-IDF. For example, when the target text is Japanese, which is an agglutinative language, known morphological analysis is applied to the text, to thereby decompose the text into words, and a filter which extracts only nouns from the decomposed words is applied. When the target text is English, which is an inflectional language, it is only required to extract only nouns from words, and to apply, for example, a filter which restores, to the original form, a word which has inflected in accordance with the difference between singular and the plural and the case.

Figure 4:
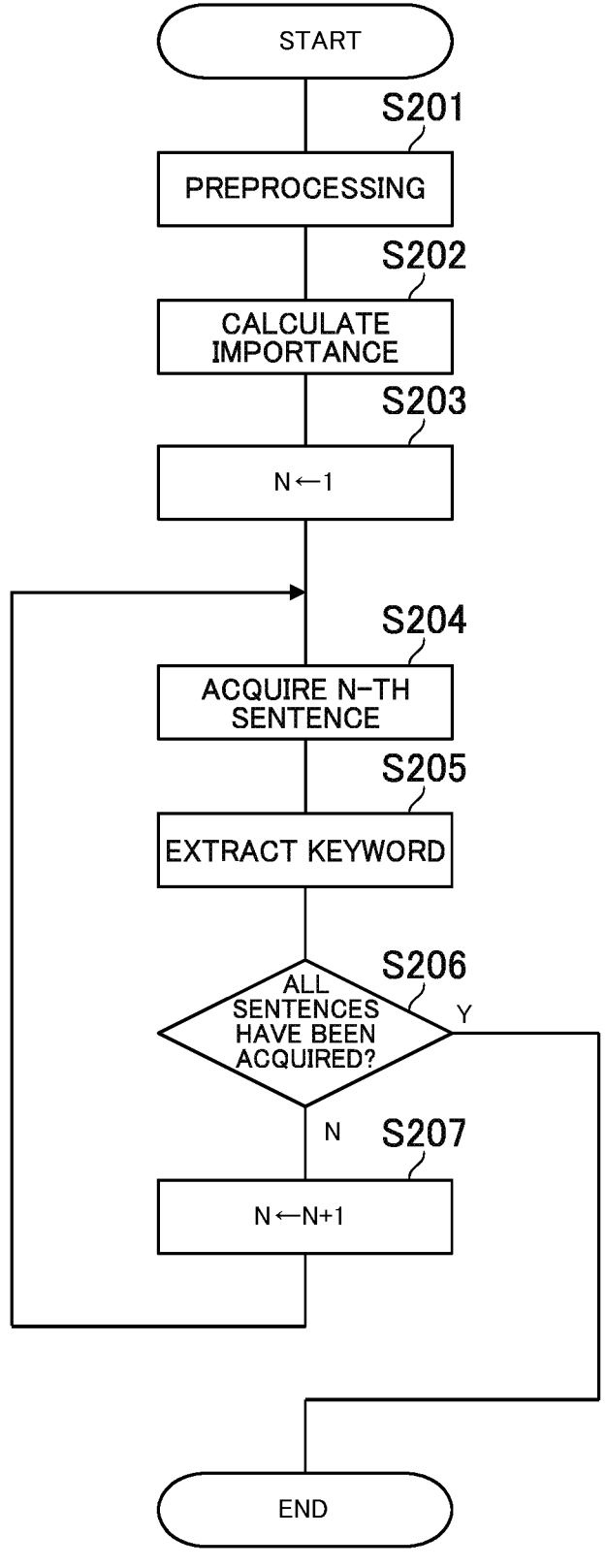
FIG. 4 is a flowchart for illustrating an example of processing of a keyword extraction module.

FIG. 4 is a flowchart for illustrating an example of the processing of the keyword extraction module 20. In Step S201, the keyword extraction module 20 applies the preprocessing to the text, to thereby extract the words to be extracted as the keywords. In this example, the morphological analysis is applied to a sentence, to thereby decompose the sentence into words, and to extract only nouns through use of the filter. Subsequently, in Step S202, for the extracted nouns, the importance of each word is calculated by the TF-IDF.

After that, in Step S203, 1 is assigned to the variable N. Subsequently, in Step S204, an N-th sentence included in the text is acquired. In Step S205, a keyword is extracted based on the importance from words included in the acquired sentence. In this embodiment, the word having the highest importance in the sentence is extracted as the keyword.

After that, in Step S206, it is determined whether or not all of the sentences included in the text have been acquired. When sentences which have not been acquired exist, 1 is added to N in Step S207. The process then returns to Step S204, and the subsequent processing steps are repeated. When all of the sentences have been acquired, the keywords have been extracted from all of the sentences included in the text, and the processing is thus finished.

Referring back to FIG. 1, the keyword classification module 30 determines the category corresponding to each of the keywords as described above. Various methods are conceivable for this determination, and each thereof is described below.

Figure 5:
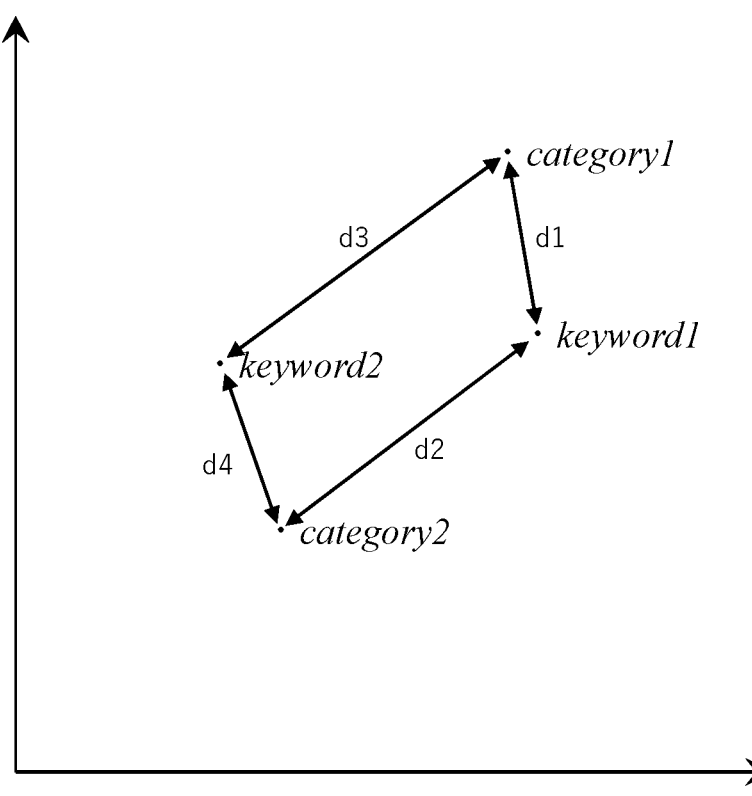
FIG. 5 is a diagram for illustrating a first example of a method of determining a category corresponding to a keyword by a keyword classification module.

FIG. 5 is a diagram for illustrating a first example of a method of determining the category corresponding to the keyword by the keyword classification module 30. In this method, the keyword classification module 30 determines a category corresponding to the extracted keyword based on a norm between the keyword and the category in a norm space.

More specifically, the keyword classification module 30 maps the words indicating the categories and the keywords extracted by the keyword extraction module 20 in a multi-dimensional norm space. That is, a certain word is represented as a vector quantity in a semantic space, and a norm in the norm space indicates a closeness in meaning between words. In FIG. 5, there is schematically illustrated a state in which words indicating two categories illustrated as category1 and category2 and two keywords illustrated as keyword1 and keyword2 are mapped in the norm space. As a method for this mapping of the words to the norm space, it is only required to use a known method such as Word2Vec, which is representative.

First, keyword1 is focused. A norm, that is, a distance from keyword1 to category1 is represented by d1. A distance from keyword1 to category2 is represented by d2. In this case, the keyword classification module 30 determines the category having the shortest distance to keyword1 as the corresponding category. That is, in this example, "d1<d2" is satisfied, and category1 is thus determined as the corresponding category.

Similarly, for the keyword2, a distance to category1 is represented by d3, and a distance to category2 is represented by d4. The relationship "d4<d3" is satisfied, and category2 is thus determined as the corresponding category.

In a second example in which the keyword classification module 30 determines the category corresponding to the keyword, the keyword classification module 30 determines a category corresponding to the extracted keyword based on correspondences between keywords and a category given in advance.

Most simply put, a thesaurus for the words used as the categories is prepared. For example, for a category "meal," breakfast, lunch, dinner, buffet, restaurant, and the like are given as the corresponding words. When the extracted keyword matches any one of those words, "meal" is determined as the corresponding category in this method.

Figure 6:
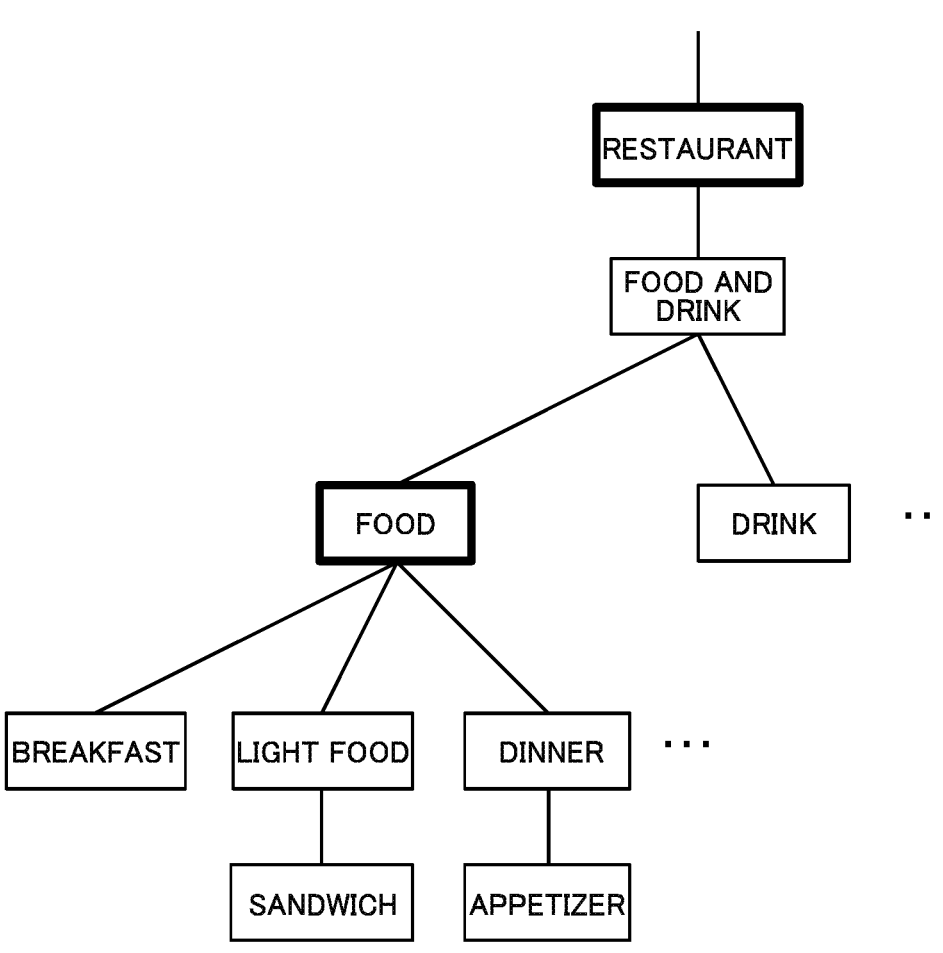
FIG. 6 is a diagram for schematically illustrating only a small part of a concept tree.

As another example, the method may be a method of using a concept tree and determining a category having the shortest distance on the concept tree as the corresponding category. FIG. 6 is a diagram for illustrating the method of using the concept tree as the correspondence between the keyword and the category.

In FIG. 6, only a small part of the concept tree is schematically illustrated. In this configuration, the concept tree represents relationships among words in a tree form while an inclusion relationship in meanings (concepts) of words is focused on. In this diagram, an upper word is arranged on an upper side of the diagram, and a lower word is arranged on a lower side of the diagram. Further, words in the inclusion relationship are connected to each other.

In this diagram, a word indicating the category is highlighted by a thick frame. Moreover, the keyword classification module 30 counts a distance between a keyword and a word indicating a category on this concept tree, and determines a category having the shortest distance as a corresponding category. This distance is conceptualized as the number of layers required to reach a target word on the concept tree. For example, when an extracted keyword is "appetizer," the category "meal" can be reached via two layers as "appetizer"→"dinner" →"meal," and the distance is thus "2". Similarly, a distance to the category "restaurant" is "4", and "meal" having the shortest distance is thus determined as the category in this case.

In a third example in which the keyword classification module 30 determines the category corresponding to the keyword, the keyword classification module 30 includes a machine learning model which receives a keyword as input and outputs a category, and inputs the extracted keyword into the machine learning model to determine the corresponding category. The machine learning model is caused to learn in advance through use of appropriate teacher data. As this machine learning model, in addition to an appropriate DNN, an appropriate machine learning model such as an SVM and a decision tree may be used.

Figure 7:
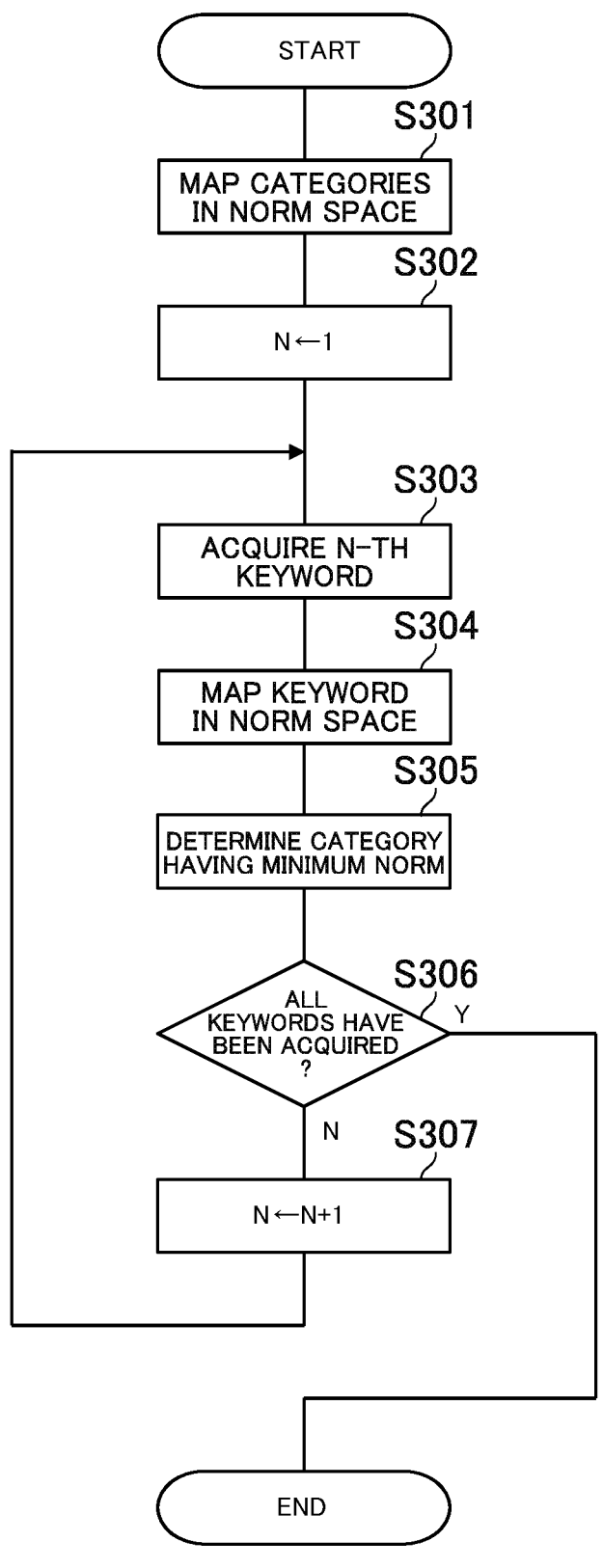
FIG. 7 is a flowchart for illustrating an example of processing of the keyword classification module by a first method.

FIG. 7 is a flowchart for illustrating an example of processing of the keyword classification module 30 by the first method. In Step S301, the keyword classification module 30 maps the words indicating the categories prepared in advance to the norm space. When this mapping of the words indicating the categories to the norm space is executed once, the mapping is not required to be executed again subsequently as long as mapped coordinates are stored.

Subsequently, in Step S302, 1 is assigned to the variable N. In Step S303, an N-th keyword is acquired. In Step S304, the acquired keyword is mapped in the norm space. After that, in Step S305, a category having the smallest norm from the keyword is determined as the corresponding category.

After that, in Step S306, it is determined whether or not all of the keywords have been acquired. When keywords which have not been acquired exist, 1 is added to N in Step S307. The process then returns to Step S303, and the subsequent processing steps are repeated. When all of the keywords have been acquired, the corresponding categories have been determined for all of the keywords extracted from the text, and the processing is thus finished.

As described above, the information-processing device 100 according to this embodiment uses the keyword extraction module 20 to extract each of the keywords in each division from the text included in the target information 2, and uses the keyword classification module 30 to classify each of the extracted keywords into the category. Thus, when the keyword extraction module 20 and the keyword classification module 30 are considered as an integrated information-processing unit, those modules can be considered as a module which extracts the category for each division of the text, and hence the keyword extraction module 20 and the keyword classification module 30 as a whole can be referred to as "category extraction module 70."

Referring back to FIG. 1, in this embodiment, in the same manner as in the keyword extraction module 20, the assessment module 40 divides the text included in the target information 2 into any units, and assesses whether the text is affirmative or negative in each division. It is preferred that this division of the text be the same as that of the keyword extraction module 20 already described. This is because the assessment obtained by the assessment module 40 is given in correspondence to the keyword extracted by the keyword extraction module 20, and it is thus considered as appropriate to assess the text for each division from which the keyword is extracted.

For this assessment, a method of the semantic analysis in the known natural language analysis may be used. Most primitively, for example, a dictionary collecting affirmative words and negative words may be created, and when the number of affirmative words included in the target division, the sentence in this case, is more than the number of negative words, the affirmative assessment may be given. Further, when the number of negative words is more than the number of affirmative words, the negative assessment may be given, and, when the number of negative words is the same as the number of affirmative words, the neutral assessment may be given. As another example, the target division may be input to an appropriately learned machine learning model, to thereby obtain numerically the assessment, and this method is used in this embodiment.

Figure 8:
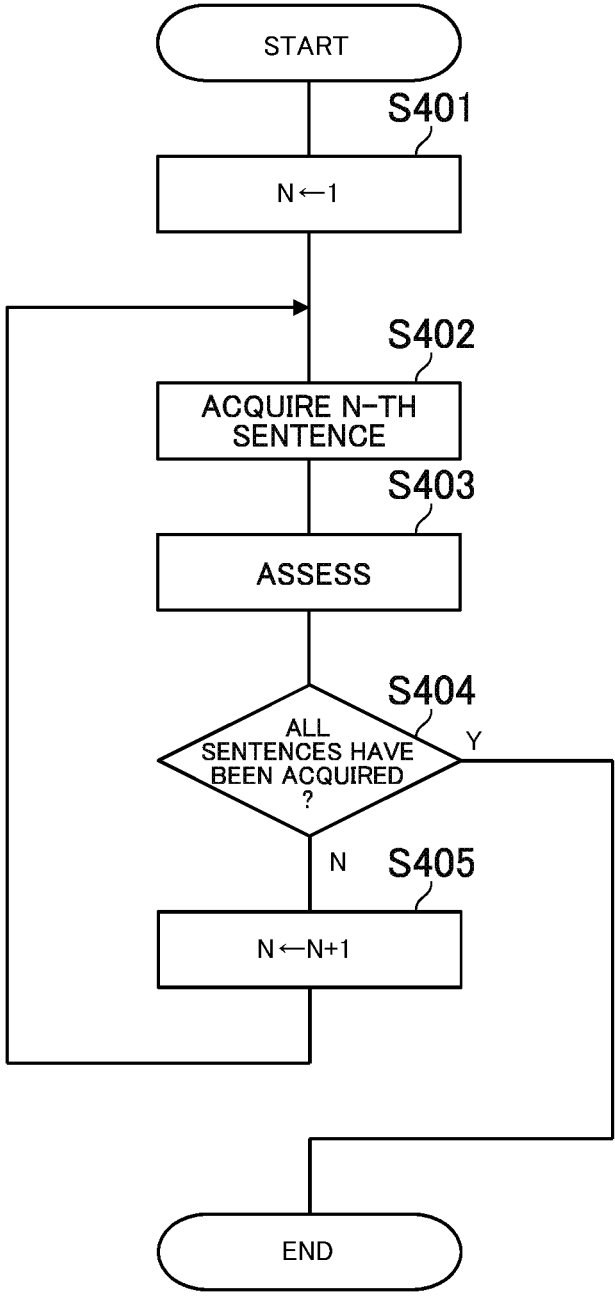
FIG. 8 is a flowchart for illustrating an example of processing of an assessment module.

FIG. 8 is a flowchart for illustrating an example of the processing of the assessment module 40. The assessment module 40 assigns 1 to the variable N in Step S401, and subsequently acquires an N-th sentence included in the text in Step S402. In Step S403, the semantic analysis is applied to the acquired sentence, to thereby assess the acquired sentence. After that, in Step S404, it is determined whether or not all of the sentences included in the text have been acquired. When sentences which have not been acquired exist, 1 is added to N in Step S405. The process then returns to Step S402, and the subsequent processing steps are repeated. When all of the sentences have been acquired, all of the sentences included in the text have been assessed, and the processing is thus finished.

In this embodiment, there is exemplified the aspect in which the assessment module 40 assesses the text based on a pair of the two polarities being affirmative and negative, but the text may be assessed based on a plurality of pairs. As the plurality of pairs, for example, four pairs based on eight polarities, namely, joy, sadness, anger, fear, fondness, dislike, relief, and surprise, are given. The polarities employed by the assessment module 40 may not be limited to affirmative and negative, and known sentiment polarities may be employed regardless of the number thereof. When the assessment module 40 assesses the text based on a plurality of pairs, a numerical (quantitative) assessment in one dimension may be obtained as this assessment by weighting each pair. Moreover, the assessment module 40 may weight each of two or more polarities, to thereby numerically (quantitatively) obtain this assessment. When this assessment is numerically obtained, the assessment may be determined on a binary basis by providing a threshold value.

Referring back to FIG. 1, in this embodiment, the score determination module 50 determines the scores of the categories based on the assessment made in the assessment module 40. That is, the assessment made in the assessment module 40 is associated with each keyword extracted in the keyword extraction module 20. In other words, this assessment is associated with the above-mentioned divided text. Moreover, the corresponding category of the divided text or the keyword included in the divided text is determined, and hence the assessments made in the assessment module 40 are linked to specific categories. Thus, it is only required for the score determination module 50 to calculate the score of each category from the assessments linked to the category. Various methods are conceivable for this determination, and each thereof is described below.

A first example of the method of determining the score of the category by the score determination module 50 is a method of simply counting the number of appearances of the affirmative assessment in each category. When the assessment made in the assessment module 40 is numerical, it is only required to provide an appropriate threshold value, to thereby treat an assessment having an assessment value equal to or higher than the threshold value as affirmative. With this configuration, for example, when the categories are described as (appearance, room, dish, . . . ), the scores are given as (5, 20, 15, . . . ) in correspondence thereto.

A second example of the method of determining the score of the category by the score determination module 50 is a method of calculating, as the score, a statistical value such as a sum or an average of the assessments when the assessments are numerical. When the assessment is given, for example, in a range of from 0 to 1, the scores are given as, for example, (0.21, 0.79, 0.60, . . . ) in the above-mentioned example.

It is only required that the method of determining the score of the category by the score determination module 50 be determined in accordance with an application of the extraction of the important images from the target information 2. For example, in the above-mentioned first method, the score is determined through use of only the affirmative assessments, and hence the first method suits to a case in which important images 3 having stronger appeal to consumers who affirmatively accept the target information 2 are required to be extracted. The above-mentioned second method suits to a case in which important images 3 appealing to consumers are required to be extracted while reducing a possibility that the consumers negatively accept the target information 2. A method other than the methods described herein may be used.

Figure 9:
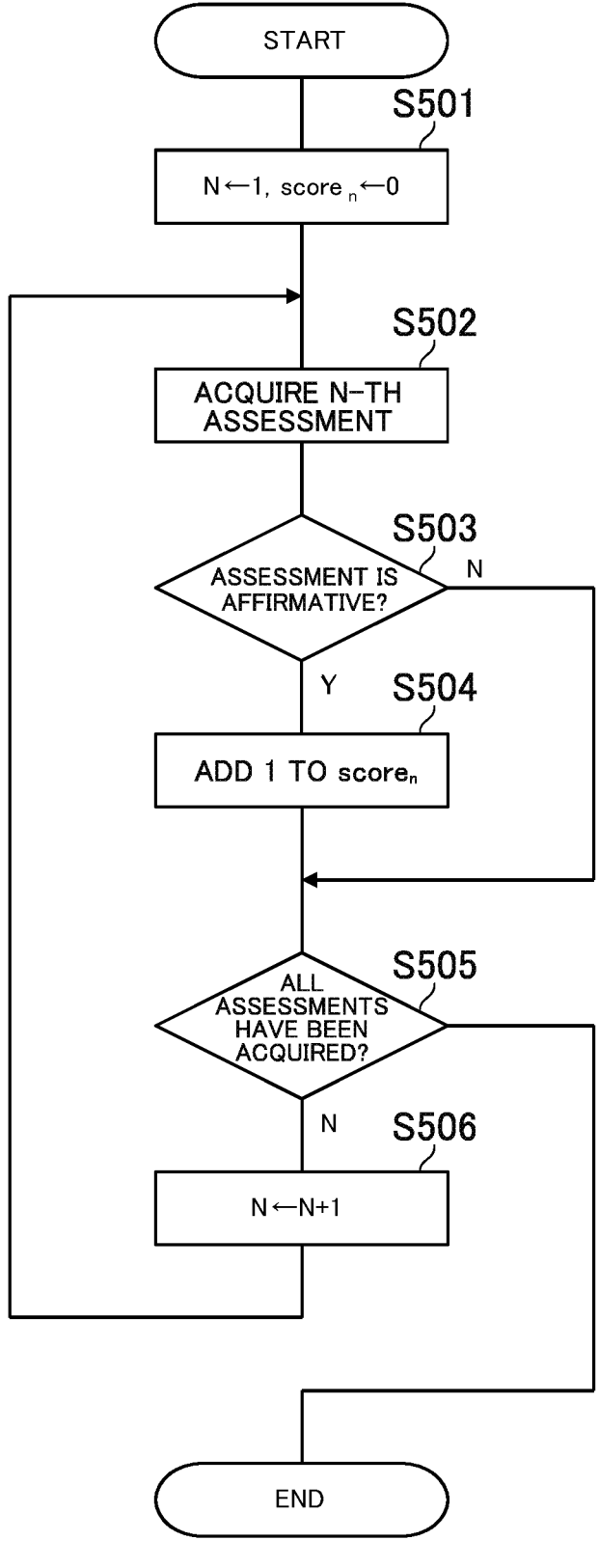
FIG. 9 is a flowchart for illustrating an example of processing of a score determination module by the first method.

FIG. 9 is a flowchart for illustrating an example of processing of the score determination module 50 by the first method. In Step S501, the score determination module 50 assigns 1 to the variable N, and assigns 0 to $score_n$ being a counter for the score. In this case, the $score_n$ is a variable indicating a score of an n-th category.

In Step S502, an N-th assessment is acquired. In Step S503, whether the acquired assessment is affirmative or negative is determined. When the assessment is affirmative, the process proceeds to Step S504, and 1 is added to the $score_n$ for a category linked to the acquired assessment. When the assessment is not affirmative, no processing is executed, and the process proceeds to Step S505. When the assessment is negative, a score also reflecting the negative assessment may be obtained by subtracting 1 or another numerical value (for example, 0.5) from $score_n$.

In Step S505, whether or not all of the assessments have been acquired is determined. When assessments which have not been acquired exist, 1 is added to N in Step S506. The process then returns to Step S502, and the subsequent processing steps are repeated. When all of the assessments have been acquired, the scores have been determined for all of the categories, and the processing is thus finished.

Referring back to FIG. 1, as described above, the image selection module 60 selects categories based on the scores, and extracts the images corresponding to those categories as important images 3. The image selection module 60 executes steps of two stages, that is, a step of selecting the categories based on the scores and a step of extracting the images corresponding to the selected categories as the important images 3, to thereby select the important images 3.

First, the selection of the categories based on the scores being the first step is, more simply put, a step of determining the number of images to be selected as the important images 3 from each of the plurality of categories in accordance with the scores.

The number of important images 3 is usually predetermined in accordance with secondary content to be created based on the important images 3. For example, when the secondary content is a slideshow or a moving image, the required number of important images are determined under conditions such as an assumed viewing time thereof. The number of important images 3 to be extracted is hereinafter referred to as "total number of extractions."

In this case, the problem is distribution of the total number of extractions to the number of important images 3 belonging to each category in order to more strongly appeal to the consumer. The score of each category determined by the score determination module 50 can be considered as an index which indicates importance of each category in order to more strongly appeal to the consumer. That is, it is considered that a large number of important images 3 are to be selected from an important category (that is, having a high score), and a smaller number of important images 3 are to be selected from an unimportant category (that is, having a low score). Meanwhile, when the selected important images 3 are excessively concentrated to a specific category, only similar images are selected, and hence it is empirically observed that the appeal to the consumer contrarily decreases. Thus, the image selection module 60 is required to, in the first step, select a larger number of important images 3 from a more important category while selecting important images 3 from more various categories.

Thus, when the number of images to be extracted as the important images 3 from an individual category is referred to as "individual number of extractions," the image selection module 60 distributes the total number of extractions to the individual number of extractions in each category. A method for this distribution may be a known method or a novel method, but a distribution method for seats in the proportional representation in the election can be generally used. Specifically, the distribution to the individual numbers of extractions can appropriately be executed by considering the categories as parties, the assessment as the number of votes, and the total number of extractions and the individual number of extracts as a total number of seats and the number of won seats, respectively.

Various distribution methods for the seats exist, and any method may be employed. In this embodiment, the Sainte-Laguë method is used from such a viewpoint that important images 3 are more likely to be extracted from a larger number of categories. However, other methods, for example, the Hare-Niemeyer method, the D'Hondt method, and the modified Sainte-Laguë method may be used.

Subsequently, in the second step, images corresponding to the selected categories are extracted as the important images 3. In this case, when the number of images included in the target information 2 and belonging to a specific category is equal to the individual number of extractions distributed to this category, it is only required to simply extract all of the images belonging to this category. However, those numbers are generally different from each other. In particular, when the number of images belonging to the specific category is larger than the individual number of extractions, it is required to select images to be extracted.

In the opposite case, that is, when the number of images belonging to the specific category is smaller than the individual number of extractions, it is only required to use a method of reassigning a disqualified seat in the proportional representation to redistribute the individual number of extractions.

Thus, the image selection module 60 assesses, in advance, appeal of each of the images included in the target information 2 at the time when this image is viewed solely. This appeal is numerically assessed, and is referred to as "image score." The image selection module 60 includes an image score determination module 61 which determines the image scores being scores for images. When there exist a plurality of images corresponding to the category selected based on the score, the image determination module 61 selects images to be extracted as the important images 3 based on the image scores of the images.

The image score determination module 61 may include, in order to determine the image score, a machine learning model which receives an image as input and output an image score. As such a machine learning model, for example, an aesthetic score assessment model based on the CNN may be used, and an obtained aesthetic score may be used as the image score. As another example, in place of or in addition to the aesthetic score assessment model, another assessment model, for example, a click through rate (CTR) prediction model may be used, and the obtained CTR prediction may be used as the image score or a weighted sum of the aesthetic score and the CTR prediction may be used as the image score. In this embodiment, the image score determination module 61 includes the aesthetic score assessment model, and uses the aesthetic score as the image score.

In order to extract images corresponding to the required individual number of extractions based on the image scores, simply put, it is only required to select images corresponding to the individual number of extractions in a descending order of the image score. However, when this simple method is employed, there can occur such a problem that images which have a high image score and are extremely close to each other and substantially the same are extracted, and the appeal of the important images 3 as a whole to the consumer decreases.

Thus, in this embodiment, when a plurality of images corresponding to one category are to be extracted, the image selection module 60 preferentially extracts images dissimilar to one another so that images similar to one another are not extracted as the important images 3. As a specific method for the extraction, the important images 3 are not extracted simply based on the order of the image score, but the important images 3 are extracted so that an assessment value Reward given by Expression 1 based on the image scores is maximized.

$$\text{Reward} = \lambda_1 \sum_{i=1}^{M} I_{score}(i) - \lambda_2 \sum_{i,j=1, i \neq j}^{M} I_{similarity}(i, j) \qquad \text{[Expression 1]}$$

In Expression 1, M is the individual number of extractions, $I_{score}(i)$ is an image score of an i-th image in one category, $I_{similarity}(i, j)$ is similarity of the i-th image and a j-th image in the one category, and $\lambda_1$ and $\lambda_2$ are any weights.

As the meaning of Expression 1, the first term is a sum of the image scores of images extracted in the one category. Thus, the assessment value Reward increases as images having higher image scores are extracted more. An absolute value of the second term increases as the number of similar images included in the extracted images increases, and as those similar images are more similar to one another. Consequently, the assessment value Reward decreases. That is, maximization of the assessment value Reward is equivalent to the extraction of images having higher image scores while avoiding extraction of images similar to one another.

The selection of images which maximize the assessment value Reward can be executed by, for example, using the dynamic programming to search for an optimal combination. Other methods may be used.

The similarity of the images used in Expression 1 may be obtained by a method used in any known image processing technology. As such a method, there are exemplified a method of using the DNN such as the CNN or another machine learning model, a method of using a distance between image feature amount vectors, a combination of those methods, and the like. In this embodiment, a machine learning model based on the CNN is used to obtain the similarity.

As the method of preferentially extracting an image dissimilar to images which have already been extracted as the important images 3 when a plurality of images corresponding to one category are to be extracted, in addition to the above-mentioned method, there may be employed, for example, a method of clustering the images belonging to the one category to as many clusters as the individual number of extractions, and selecting an image having the highest image score in each cluster. Other methods may be used.

Figure 10:
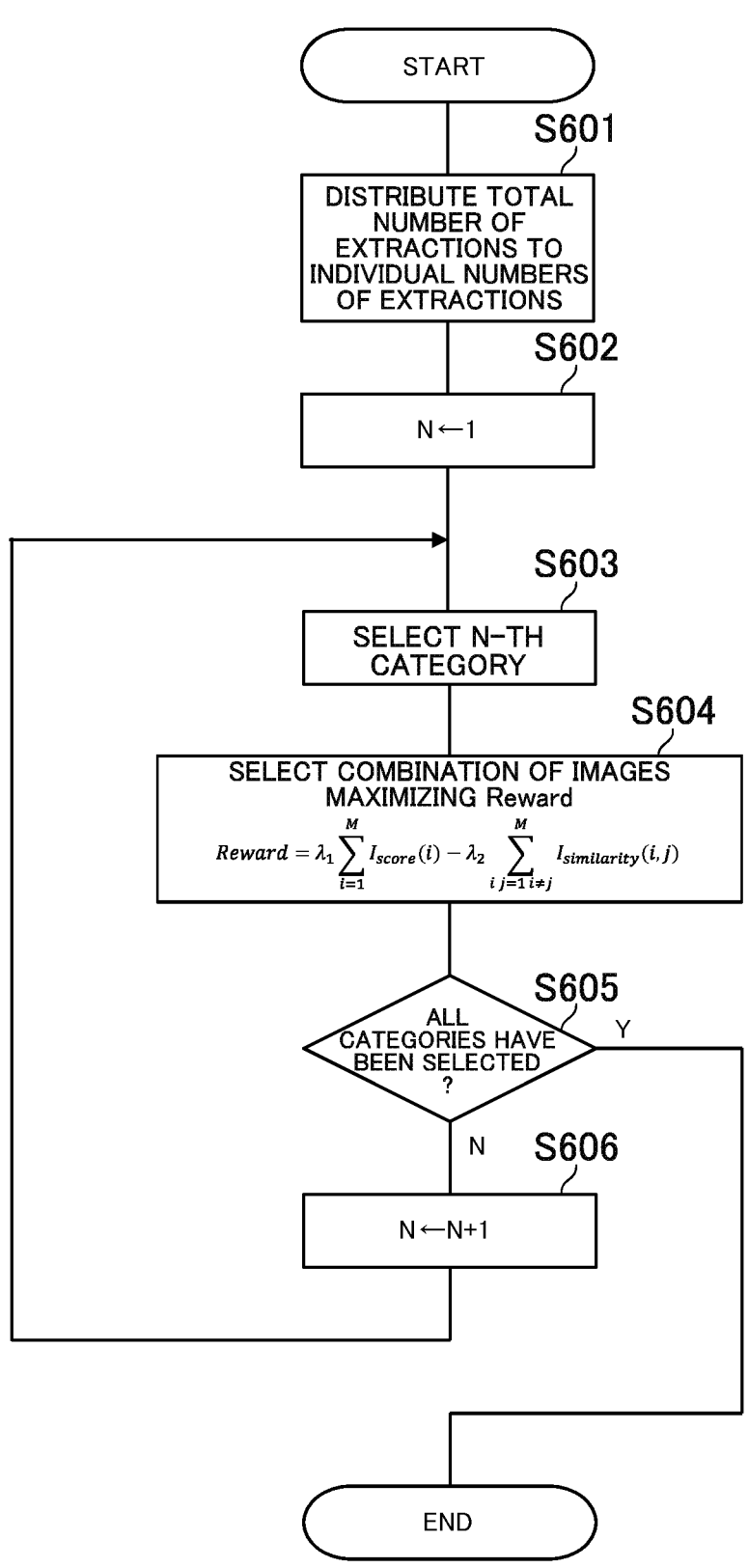
FIG. 10 is a flowchart for illustrating an example of processing of an image selection module.

FIG. 10 is a flowchart for illustrating an example of the processing of the image selection module 60. In Step S601, the image selection module 60 distributes, based on the scores, the total number of extractions to the individual number of extractions in each category. A specific algorithm for this distribution is well known, and is thus not particularly described here.

The image selection module 60 subsequently assigns 1 to the variable N in Step S602, and further selects an N-th category in Step S603. In Step S604, the dynamic programming is used to select the combination of images corresponding to the individual number of extractions which optimizes the assessment value Reward. The images extracted in this case are the important images 3.

In Step S605, whether or not all of the categories have been selected is determined. When categories which have not been selected exist, 1 is added to N in Step S606. The process then returns to Step S603, and the subsequent processing steps are repeated. When all of the categories have been selected, as many important images 3 as the total number of extractions have been selected, and the processing is thus finished.

Figure 11:
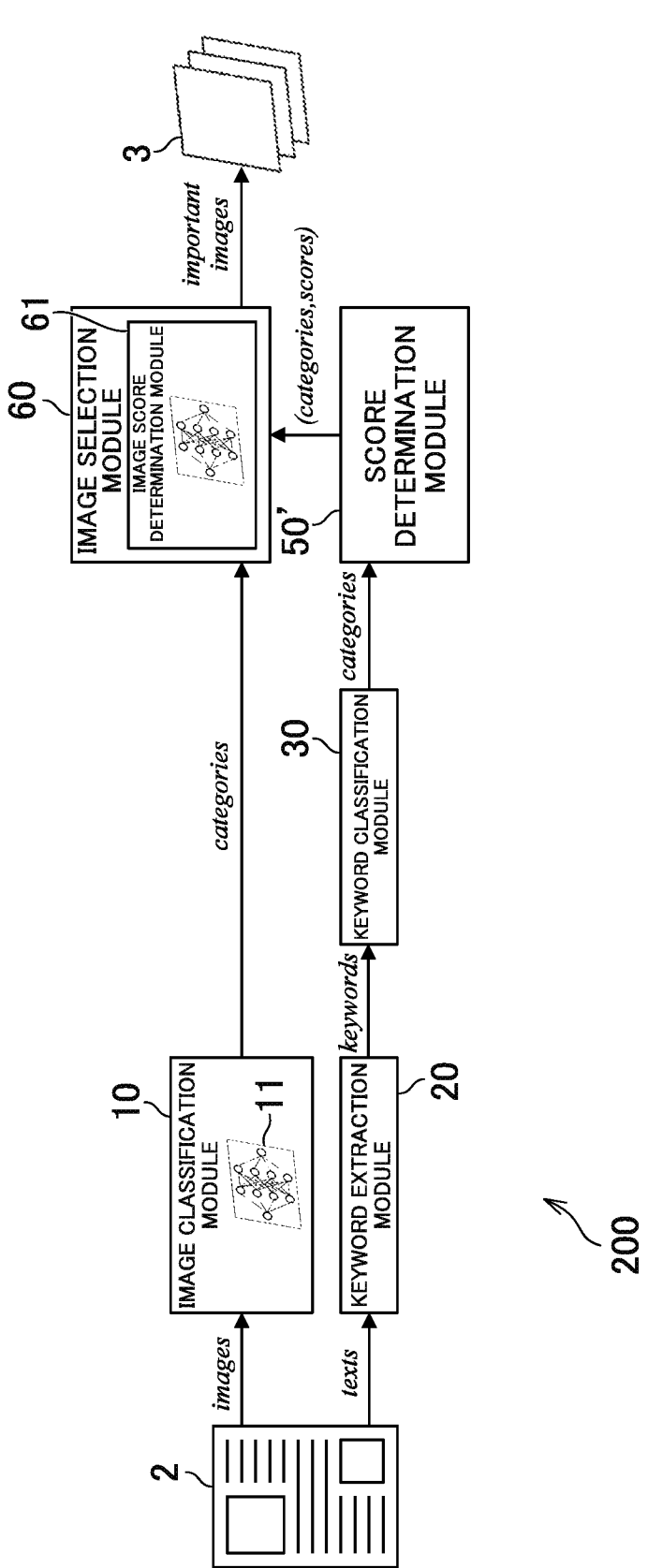
FIG. 11 is a functional conceptual diagram of an information-processing device according to a second embodiment of the present invention.

FIG. 11 is a functional conceptual diagram of an information-processing device 200 according to a second embodiment of the present invention. In this embodiment, a purpose of use and most of a configuration of the information-processing device 200 are common to those of the information-processing device 100 according to the previous embodiment. Thus, the same components are denoted by the same reference symbols, and description in the previous embodiment is incorporated for a redundant description thereof, and is not given again.

The information-processing device 200 is not provided with the assessment module 40 (see FIG. 1) of the information-processing device 100 according to the previous embodiment. Thus, to a score determination module 50' of the information-processing device 200, only the categories determined based on the keywords extracted from the text are input.

Accordingly, the score determination module 50' cannot determine the score based on the assessment for the category. In this case, it is only required that the score determination module 50' count the number of appearances of each of the categories finally obtained based on the text, and set the number of appearances as the score. In this case, the context in which the keyword corresponding to the category is used in the text is not considered, but, for the target information 2 having such a nature that the assessment such as the affirmative assessment and the negative assessment is not required to be considered, appropriate important images 3 are obtained even when the information-processing device 200 is used. As such target information 2, there are exemplified, for example, content (for example, catalog) mainly including objective information and content (for example, academic paper) in which negative information is considered almost as important as affirmative information.

Figure 12:
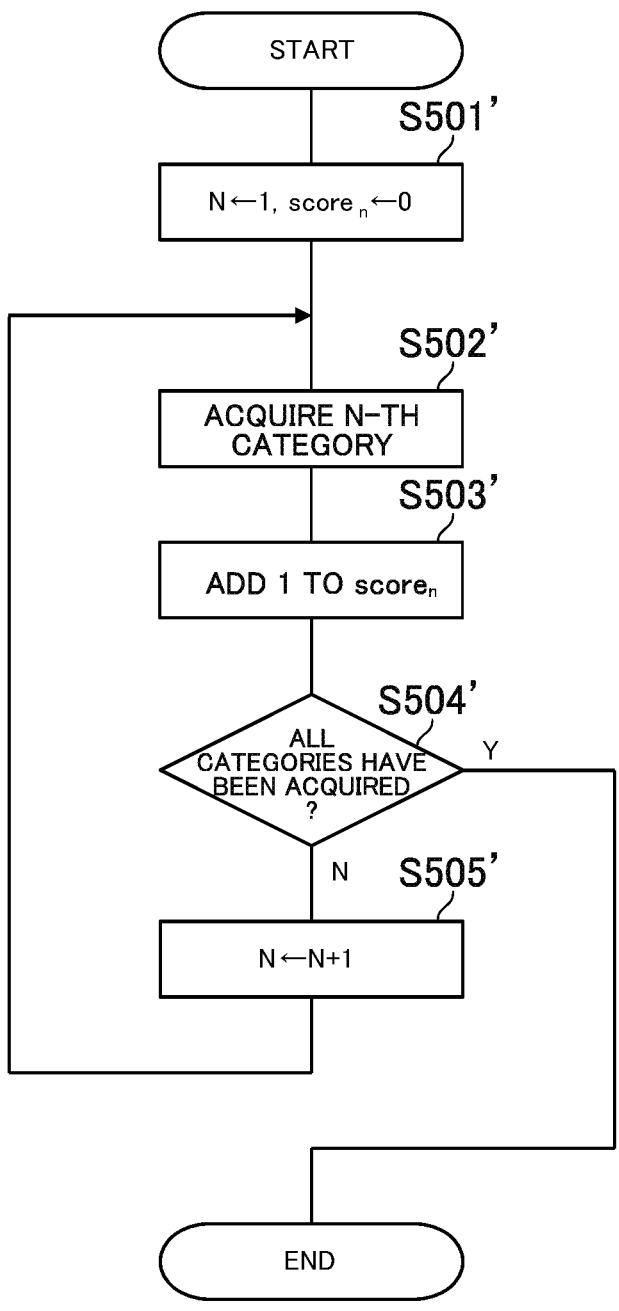
FIG. 12 is a flowchart for illustrating an example of processing of a score determination module in the second embodiment.

FIG. 12 is a flowchart for illustrating an example of processing of the score determination module 50' in the second embodiment. In Step S501', the score determination module 50' assigns 1 to the variable N, and assigns 0 to $score_n$ being a counter for the score. Also in this case, the $score_n$ is a variable indicating a score of an n-th category.

In Step S502', an N-th category is acquired. In Step S503', 1 is added to $score_n$ corresponding to the acquired category. Subsequently, in Step S504', whether or not all of the categories have been acquired is determined. When categories which have not been acquired exist, 1 is added to N in Step S505'. The process then returns to Step S502', and the subsequent processing steps are repeated. When all of the categories have been acquired, the scores have been determined for all of the categories, and the processing is thus finished.

Other configurations of the information-processing device 200 may be the same as those of the information-processing device 100 according to the previous embodiment. According to the information-processing device 200 of this embodiment, it is also possible to automatically extract, from content including a plurality of images and a text, an important image which can attract attention of a user to the content.

Figure 13:
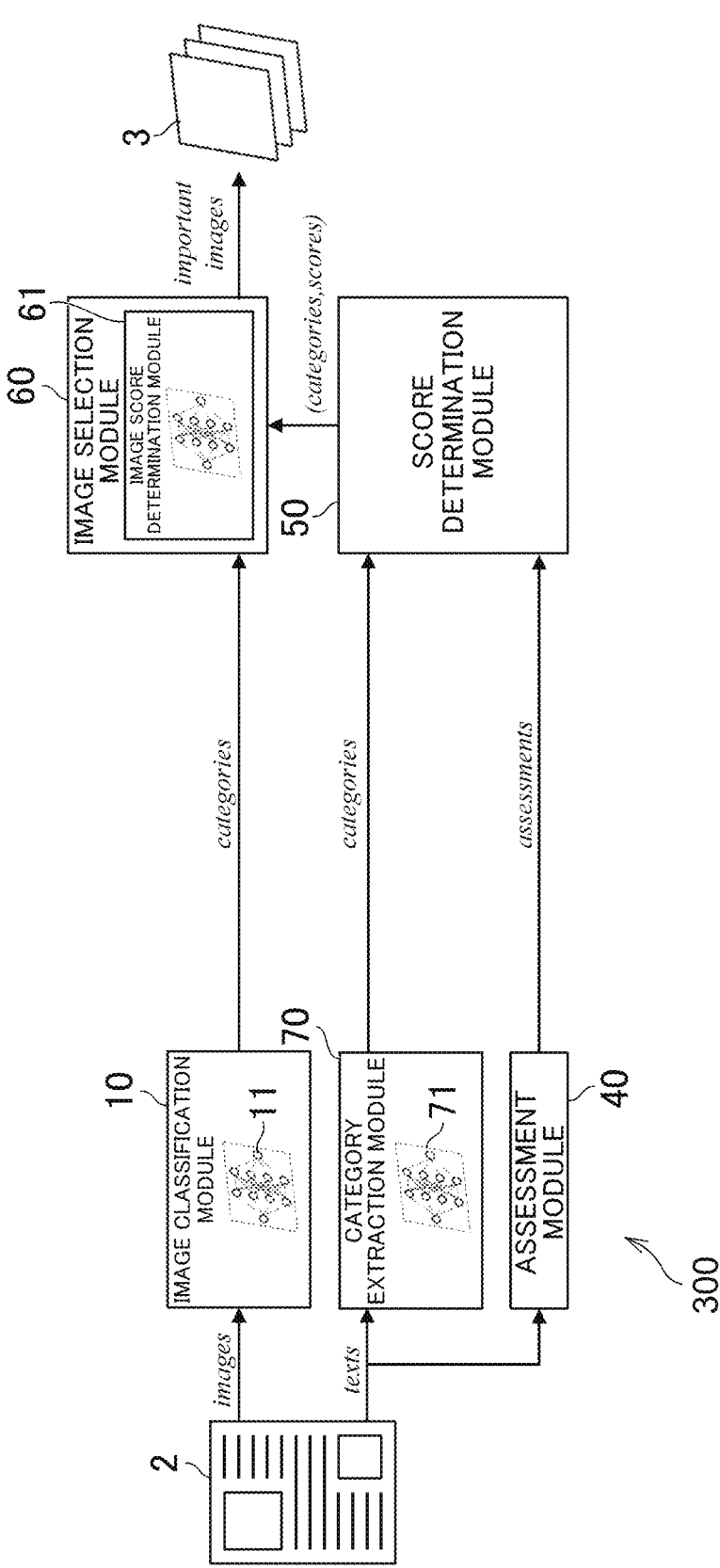
FIG. 13 is a functional conceptual diagram of an information-processing device according to a third embodiment of the present invention.

FIG. 13 is a functional conceptual diagram of an information-processing device 300 according to a third embodiment of the present invention. Also in this embodiment, a purpose of use and most of a configuration of the information-processing device 300 are common to those of the information-processing device 100 according to the first embodiment. Thus, the same components are denoted by the same reference symbols, and description in the previous embodiment is incorporated for a redundant description thereof, and is not given again.

In this embodiment, in place of the keyword extraction module 20 and the keyword classification module 30, the category extraction module 70 is configured to directly extract the categories from the text included in the target information 2. Specifically, the category extraction module 70 includes a machine learning model 71 which receives a text as input, to thereby output categories, and the categories are extracted by directly inputting the text of the target information 2 to the machine learning model 71.

In this case, the machine learning model 71 may be a learned model based on the transformer. Moreover, the category extraction module 70 may, in advance, divide the text included in the target information 2 into any units before the input of the text into the machine learning model 71 in the same manner as in the keyword extraction module 20 included in the information-processing devices 100 and 200 according to the first embodiment and the second embodiment. A category for each division is immediately obtained by inputting the text in each division into the machine learning model 71.

Also with this configuration, the information-processing device 300 can use the score determination module 50 to obtain the information (category, score) formed of the set of the category and the score, and can thus subsequently use the image selection module 60 to extract the important images 3 in the same manner as in the information-processing device 100 according to the first embodiment.

The invention claimed is:

1. An information-processing device for extracting an important image from target information, the information-processing device comprising:

a CPU; and a memory storing instructions for causing the information-processing device, when executed by the CPU, to:

wherein the target information comprises a plurality of images and a text;

map a word indicating an image category or a text category and an extracted keyword in a multi-dimensional norm space;

determine the image category indicating an attribute of each image among the plurality of images;

extract the text category for each division of the text;

determine a score of the text category based on the text; and extract, as a most important image among the plurality of images, one of the images with the image category corresponding to the text category selected based on the score.

2. The information-processing device according to claim 1, wherein the instructions further cause the information-processing device to:

extract the keyword from the text; and determine the text category corresponding to the extracted keyword.

3. The information-processing device according to claim 2, wherein the instructions further cause the information-processing device to:

determine, based on a norm between the keyword and the text category in the multi-dimensional norm space, the text category corresponding to the extracted keyword.

4. The information-processing device according to claim 2, wherein the instructions further cause the information-processing device to:

determine, based on a correspondence between the keyword and the text category given in advance, the text category corresponding to the extracted keyword.

5. The information-processing device according to claim 2, wherein the instructions further cause the information-processing device to:

include a machine learning model configured to receive a keyword as input and to output a text category, and is configured to input the extracted keyword into the machine learning model, to thereby determine the corresponding text category.

6. The information-processing device according to claim 1, wherein the instructions further cause the information-processing device to:

include a machine learning model configured to receive the text as input to output the text category.

7. The information-processing device according to claim 1, wherein the instructions further cause the information-processing device to:

include a machine learning model configured to receive each of the images as input, and to output the image category.

8. The information-processing device according to claim 1, wherein the instructions further cause the information-processing device to:

assess whether the text is affirmative or negative, and determine the score based on the assessment.

9. The information-processing device according to claim 8, wherein the instructions further cause the information-processing device to:

determine the score based on a number of appearances of the affirmative assessment for the determined text category.

10. The information-processing device according to claim 8, wherein the instructions further cause the information-processing device to:

determine the score based on a value of the assessment for the determined text category.

11. The information-processing device according to claim 1, wherein the instructions further cause the information-processing device to:

distribute, for each image category, a total number of extractions specified in advance being the number of extractions of the important images to an individual number of extractions being the number of extractions of the images as the important images in each image category.

12. The information-processing device according to claim 11, wherein the instructions further cause the information-processing device to:

preferentially extract images dissimilar to one another when a plurality of images corresponding to one image category are to be extracted.

13. The information-processing device according to claim 12, wherein the instructions further cause the information-processing device to:

assess similarity between the images through use of a method selected from a method of using a machine learning model, a method of using a distance between image feature amount vectors, and a combination thereof.

14. The information-processing device according to claim 1, wherein the instructions further cause the information-processing device to:

determine an image score being a score for each of the images, and select, when a plurality of images corresponding to the image category selected based on the score exist, one of the plurality of images to be extracted as the important image based on the image score of each of the plurality of images.

15. The information-processing device according to claim 14, wherein the instructions further cause the information-processing device to:

include a machine learning model configured to receive each of the plurality of images as input, and to output the image score.

16. The information-processing device according to claim 1, wherein the instructions further cause the information-processing device to determine the text category having a shortest distance between the word indicating the text category and the extracted keyword in the multi-dimensional norm space.

17. An information-processing method of extracting an important image from target information, the information-processing method causing a computer to execute:

wherein the target information comprises a plurality of images and a text;

mapping a word indicating an image category or a text category and an extracted keyword in a multi-dimensional norm space;

determining the image category indicating an attribute of each image among the plurality of images;

extracting the text category for each division of the text;

determining a score of the text category based on the text; and extracting, as a most important image among the plurality of images, one of the images with the image category corresponding to the text category selected based on the score.

18. A non-transitory computer-readable information recording medium storing an information-processing program for causing a computer to:

map a word indicating an image category or a text category and an extracted keyword in a multi-dimensional norm space;

wherein the keyword is extracted from target information that comprises a plurality of images and a text;

determine the image category indicating an attribute of each image among the plurality of images;

extract the text category for each division of the text;

determine a score of the text category based on the text; and extract, as a most important image among the plurality of images, one of the images with the image category corresponding to the text category selected based on the score.

* * * * *